United States Patent
Cannell et al.

(10) Patent No.: US 6,741,678 B2
(45) Date of Patent: May 25, 2004

(54) METHOD AND SYSTEM FOR SENDING A DATA RESPONSE FROM A CALLED PHONE TO A CALLING PHONE

(75) Inventors: Lynell Earline Cannell, Naperville, IL (US); Eric Harold Henrikson, Redmond, WA (US); Donna Michaels Sand, Redmond, WA (US)

(73) Assignee: Lucent Technologies Inc., Murray Hill, NJ (US)

( * ) Notice: Subject to any disclaimer, the term of this patent is extended or adjusted under 35 U.S.C. 154(b) by 78 days.

(21) Appl. No.: 09/871,193

(22) Filed: May 31, 2001

(65) Prior Publication Data

US 2002/0181672 A1 Dec. 5, 2002

(51) Int. Cl.7 .............................................. H04M 1/64
(52) U.S. Cl. .................................. 379/88.14; 455/414.1
(58) Field of Search ........................ 379/67.1, 70, 88.11, 379/88.12, 88.14, 88.16, 88.22, 88.23; 455/412.1, 412.2, 413, 414.1, 414.4, 415, 417, 567

(56) References Cited

U.S. PATENT DOCUMENTS

| | | | | | |
|---|---|---|---|---|---|
| 5,327,486 A | * | 7/1994 | Wolff et al. | ............... | 379/93.23 |
| 5,930,700 A | * | 7/1999 | Pepper et al. | ............... | 455/414 |
| 6,018,671 A | * | 1/2000 | Bremer | ..................... | 455/567 |
| 6,216,016 B1 | * | 4/2001 | Cronin | ..................... | 455/567 |
| 6,219,413 B1 | * | 4/2001 | Burg | ..................... | 379/215.01 |
| 6,301,338 B1 | * | 10/2001 | Makela et al. | ........... | 379/88.21 |
| 6,404,860 B1 | * | 6/2002 | Casellini | .................. | 379/88.17 |
| 6,529,737 B1 | * | 3/2003 | Skinner et al. | ............. | 455/466 |
| 6,577,859 B1 | * | 6/2003 | Zahavi et al. | ............. | 455/412.1 |
| 6,590,887 B1 | * | 7/2003 | Lee | ............................. | 370/342 |

* cited by examiner

Primary Examiner—Scott L. Weaver
(74) Attorney, Agent, or Firm—John B. MacIntyre

(57) ABSTRACT

The present invention provides a method and communication system for sending a data response from a called phone to a calling phone in response to a call request from the calling phone. The calling phone sends a call request to the called phone. The call request is a request to establish a communication between the called phone and the calling phone on a call path. If the called phone decides not to answer the call request, the called phone can send a data message to the calling phone. If the calling phone is data-capable, the data message is sent directly to the calling phone. If the calling phone is not data-capable, the data message is sent to a server that converts the data message to a voice message and sends the voice message to the calling phone. The calling phone can send a message back to the called phone in response to the data message sent from the called phone. If the calling phone is not data-capable, the response message is sent to a server that converts the voice message to a data message and sends the data message to the called phone. If the calling phone is data capable, the calling phone sends the response data message directly to the called phone.

21 Claims, 2 Drawing Sheets

METHOD AND SYSTEM FOR SENDING A DATA RESPONSE FROM A CALLED PHONE TO A CALLING PHONE

FIELD OF THE INVENTION

The present invention relates generally to communication systems, and more particularly to a method for sending a response from a called phone to a calling phone.

BACKGROUND OF THE INVENTION

In current wireless communication systems, when a call request is received for a wireless phone, the wireless phone is located and sent a paging message. If the user of the wireless phone is near the wireless phone and has the phone turned on, he can answer the call request, thereby completing the call on the call path requested by the communication system.

There are times when a user of a wireless phone may receive a call request at a time or in a location in which the user cannot conveniently answer the call request but would like to communicate with the calling party. For example, the user may be in a meeting or in a court room. In these situations, the user has to either answer the call, which is an intrusion, or not answer the call, which can lead to a missed opportunity to communicate with the calling party.

Therefore, a need exists for a method and communication system for allowing a user to communicate with a calling party without answering the call request and establishing a call path between the calling phone and the called phone.

BRIEF SUMMARY OF THE INVENTION

It is an object of the present invention to provide a method and communication system for a user of a called phone to communicate with a calling party without answering a call request from the calling party. The response is preferably a data response that can be sent directly from the called phone to the calling phone or can be a data response that is converted to voice (speech) by a server if the calling phone is not capable of receiving data communications. The present invention also contemplates the sending of a response data message from the calling phone to the called phone in response to the data message received at the calling phone from the called phone. This response message can be a data message that is sent directly from the calling phone to the called phone, or can be a voice message that is sent from the calling phone to a server that converts the message to a data message and forwards the response data message to the called phone.

The invention works as follows. A calling phone sends a call request to a called phone. The call request is a request to establish a communication between the called phone and the calling phone on a call path. Upon receiving the call request, a user of the called phone decides not to answer the call in the usual manner. Rather, the called phone sends a response message to the calling phone, without answering the call request, which would have established a call path between the called phone and the calling phone. In this manner, a message can be sent to the calling phone without completing the call request. The user of the called phone may be in a setting that is not conducive to completing and carrying on a conversation, such as a court room, but may want to communicate a message to the calling phone.

The called phone responds to the call request with a data message. This message is sent to the calling phone without completing the call, and therefore the call path is not established. If the calling phone is data capable, the data message is preferably sent directly to the calling phone. If the calling phone is not data capable, the data message is converted to a voice (speech) message by a server, which sends the converted voice message to the calling phone. The server can be sent the message intentionally by the called phone, or can intercept the data message intended for the calling phone, convert it to a voice message, and then forward the converted voice message to the calling phone. Alternately, the user may be engaged in a current conversation when the call request arrives.

The calling phone can respond to the data message with a data message of its own. If the calling phone is data capable, the calling phone can send a data message directly to the called phone. If the data message is not data capable, it can send a voice message to a server (which may or may not be the server that performs the data-to-speech conversion), which translates the voice message to a data message. This data message is then sent to the called phone.

Thus, the present invention provides a method and communication system for allowing a user to communicate with a calling party without answering a call request from the calling party. In this manner, communication can occur between a calling phone and a called phone without completing the call path between the two phones.

DETAILED DESCRIPTION OF THE INVENTION

Figure 1:
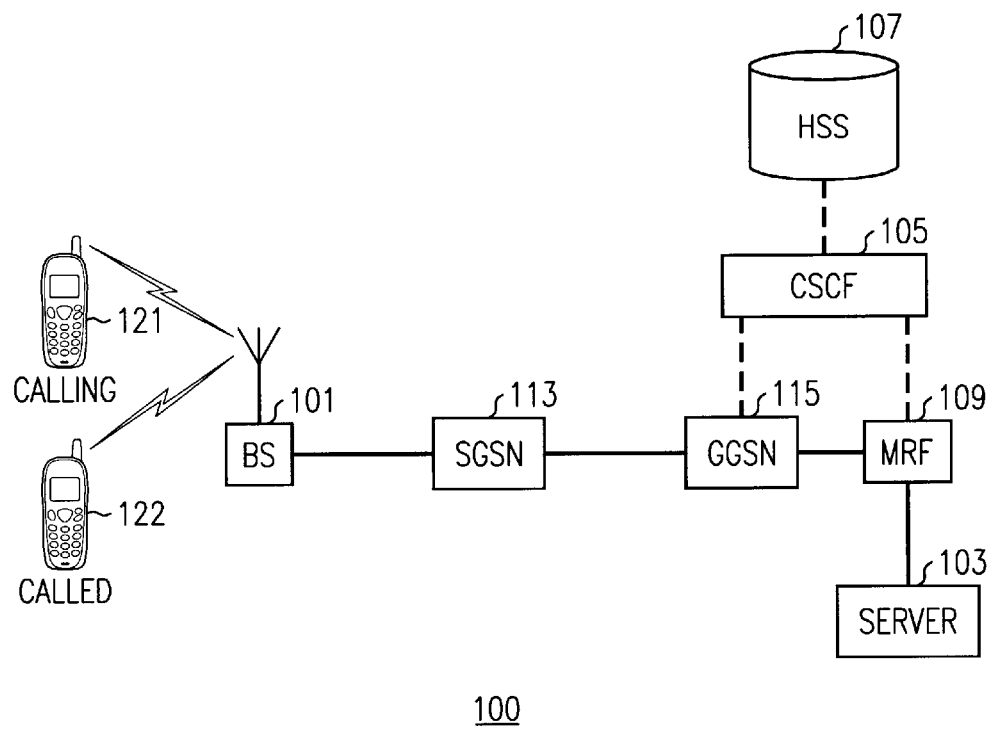
FIG. 1 depicts a communication system in accordance with the present invention.
Figure 2:
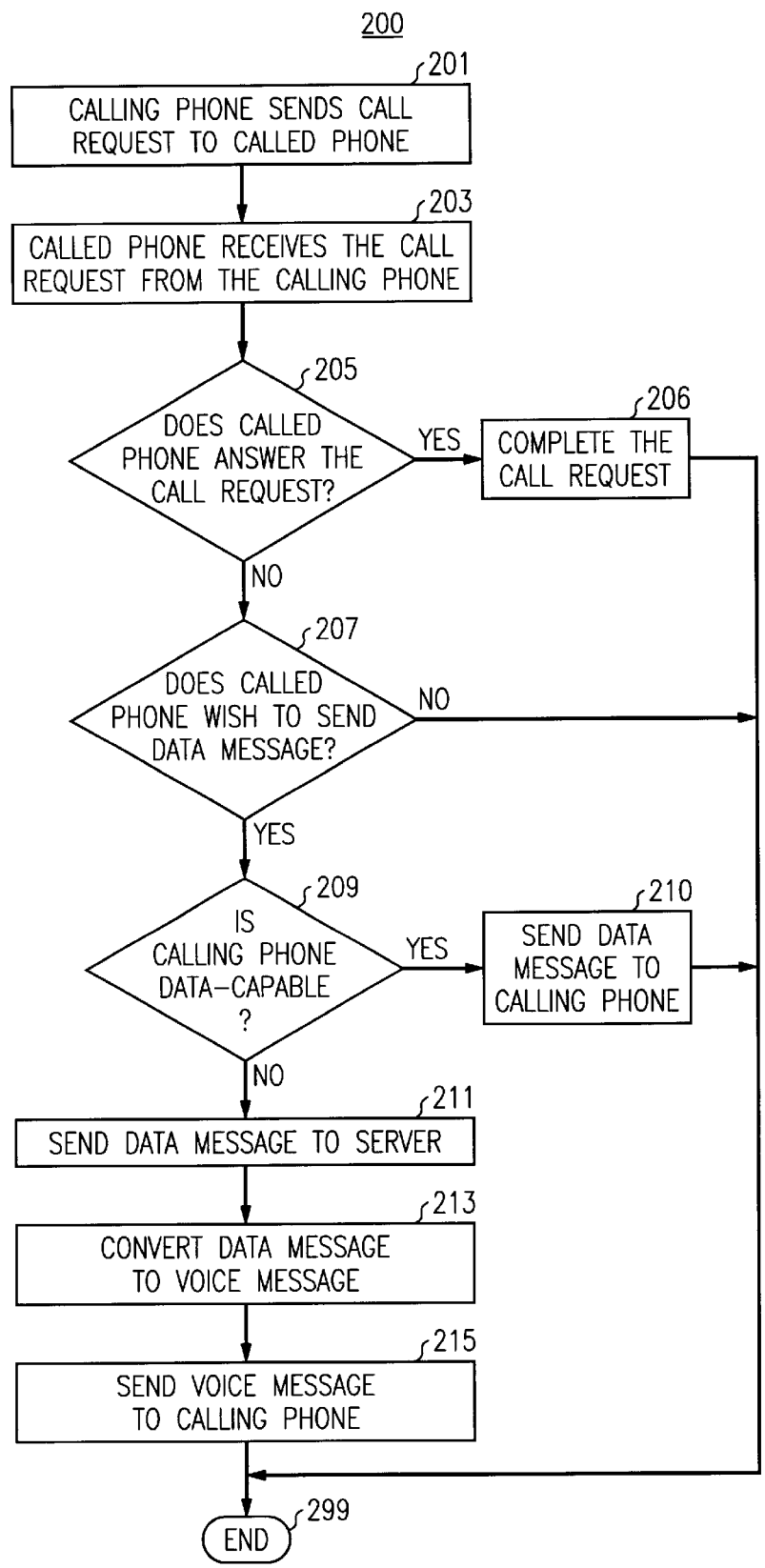
FIG. 2 depicts a flow chart of a call flow for sending a non-verbal response from a called phone to a calling phone in accordance with the present invention.

The present invention can be better understood with reference to FIGS. 1 and 2. FIG. 1 depicts a communication system 100 in accordance with the present invention. In an exemplary embodiment depicted in FIG. 1, communication system 100 is a Third Generation (3G) wireless system. Communication system 100 can alternately be any digital cellular system. 3G wireless systems include multiple air interface standards, including cdma2000, Wideband CDMA (W-CDMA), and UWC-136, a Wideband TDMA technology.

Communication system 100 includes a base station 101, server 103, a call processing control entity (Call Session Control Function (CSCF) 105), a subscriber database (Home Subscriber Server (HSS) 107), a Multimedia Resource Function (MRF) 109, a Serving GPRS Support Node (SGSN) 113, and a Gateway GPRS Support Node (GGSN) 115. It should be understood that wireless system 100 typically includes a plurality of base stations, but only one, base station 111, is depicted for clarity.

FIG. 1 also depicts two wireless units, a calling phone 121 and a called phone 122. Communication system 100 can support a plurality of wireless units, but only two wireless units are depicted for clarity. Calling phone 121 is depicted in FIG. 1 as a wireless unit, but can alternately be a landline telephone or any other communication device capable of generating a call request.

Base station 101 includes a transmitter and receiver and is disposed within a predetermined geographic region. Base station 101 communicates over the air utilizing Radio Frequency (RF) signals with calling phone 121 and called phone 122. The type of RF signaling utilized by base station 101 depends upon the air interface of communication system 100. Although FIG. 1 depicts calling phone 121 and called phone 122 as communicating with base station 101, it should be understood that calling phone 121 and called phone 122 can be communicating with different base stations. In that scenario, the messages would traverse communication system 100 using known methods. Further, calling phone 121 can be a wireline phone connected to communication system 100 via the PSTN, or a Packet Data Network (PDN) for other Session Initiation Protocol (SIP) enabled devices.

Server 103 includes a processor and is coupled to MRF 109. In an exemplary embodiment of the present invention, server 103 includes an automated speech recognition resource to convert a speech message to a data message and a text-to-speech converter to convert a data message to a speech message. In a second exemplary embodiment of the present invention, communication system 100 includes two servers, the first server including the automated speech recognition resource and he second server including the text-to-speech converter. Server 103 performs conversion of messages sent to and from calling phone 121 and called phone 122.

CSCF 105 is the call processing control entity in system 100. CSCF 105 provides bearer connection control for the call. HSS 107 is the subscriber database of communication system 100. HSS 107 is a database that stores the home location and the current location of wireless units within communication system 100. HSS 107 also stores a user profile, which includes the services to which a mobile unit subscribes.

MRF 109 is coupled to CSCF 105 via control and to GGSN 115 via bearer. MRF 109 provides an interface to the user for playing a message to the caller, stating the options available to the caller, receiving the caller's choice via an interaction with the calling party, and forwarding the caller's choice to CSCF 105.

Serving GPRS Support Node (SGSN) 113 is coupled to base station 101. SGSN 113 is primarily responsible for mobility management. SGSN 113 also wireless stations in the local area for the transmission and receipt of packets. SGSN 113 also locates and identifies the status of wireless stations and gathers crucial call information, an essential aspect of billing. SGSN 113 also provides the functions of ciphering, compression and other services.

Gateway GPRS Support Node (GGSN) 115. GGSN 115 is coupled to the PSTN via a Media Gateway. GGSN 115 provides packet routing and transfers, assisting in mobility management in conjunction with SGSN 113, quality of service functionality, authentication, and system management functionality.

FIG. 2 depicts a flow chart 200 of a call flow for sending a non-verbal response from a called phone to a calling phone in accordance with the present invention. A calling phone sends (201) a call request for the called phone. The call request is typically generated by pressing an identifier, such as the directory number, associated with the called phone. The call request is a request for the called phone to establish a voice communication by answering the call request. In an exemplary embodiment, the call request includes an indication of whether the calling phone is capable of receiving a data message. This is preferably determined when the identification of the calling phone is a SIP Uniform Resource Locator (URL), such as "user@serviceprovider.com". The indicator can also include the type of data that is capable of being received, such as packetized voice data, multimedia data, video, or other types of data.

In a second exemplary embodiment, the call request includes an indicator that the calling phone is not capable of receiving a data message. This information can be used by the communication system in determining what type of response to send to the calling phone and where to send the response. For example, if the calling phone is unable to receive a data message, system resources would be wasted if the called phone were to send a multimedia message to the calling phone in response to the call request. In this example, the called phone would send a voice message to the calling phone.

The called phone receives (203) the call request from the called phone. The call request is a request for the called phone to establish a voice communication by answering the call request, thereby completing the call request. The call request is an attempt by the calling phone to establish a call path between the calling phone and the called phone.

It is then determined (205) if the called phone answers the call request. If the called phone does answer the call request, the call request is completed (206) and a call between the calling phone and the called phone is established in accordance with known methods. The process then ends (299).

If the user of the called phone does not answer the call request at step 205, the called phone determines (207) if the called phone wishes to send a data message to the calling phone. If not, the call request will not be completed as in the prior art and the process ends (299). This can occur when the user is not able to answer the call request, either due to being away from the called phone or being busy with another matter. In this case, the calling party may be directed to the voice mail associated with the called party, or may be left hearing a continuous string of ringing signals that indicate that the called phone is not going to answer this call request at this time.

In an exemplary embodiment, if the called phone wishes to send a data message to the calling phone as determined at step 207, the system determines (209) if the calling phone is data capable. This is preferably done by checking the indicator that was included in the call request sent from the calling phone. Alternately, this information can be stored by the communication system and retrieved at this point to determine whether the calling phone is data-capable. If the calling phone is capable of receiving data messages as determined at step 209, the called phone sends (210) a data message to the calling phone. Alternately, the default can be set such that the called phone sends a data message in response to the call request from the calling phone. If the calling phone is not data capable, the data response would not be effectively processed by the calling phone, and the calling phone would act in the same way as if no action was taken by the called phone in response to the call request. The process then ends (299).

In an exemplary embodiment of the present invention, the calling phone can send a response data message to the called phone in response to the data message received from the called phone. The response data message may indicate that the calling phone has received the data message, or can be a message including a response to the data message sent from called phone to calling phone. If the calling phone is data capable, the response data message is preferably sent directly to the called phone. If the calling phone is not data capable, the calling phone can send a voice response message to a server, which converts the voice response message to a response data message and forwards the response data message to the called phone. The server preferably uses an automated speech recognition resource to convert the speech message to data. The speech-to-text converter and the text-to-speech converter can be located in the same server, or can be located in different processors within the communication system.

If it is determined at step 209 that the calling phone is not data capable, the called phone sends (211) a data message to a server without establishing a call path between the called phone and the calling phone. The server may intercept the data message from the called phone, or the called phone may send the data message directly to the server.

The server converts (213) the data message into a speech message, preferably by utilizing a text-to-speech converter. The server then sends (215) the speech message to the calling phone. The process then ends (299).

Thus, the present invention provides a method and communication system for sending a data response from a called phone to a calling phone without establishing a call path between the calling phone and the called phone. The data response is sent in response to a call request sent from the calling phone to the called phone. The present invention thereby provides the ability for a called phone to respond to a call request without answering the call and establishing a call path with the calling phone. This provides a user of the called phone with increased flexibility in responding to call requests, particularly when the call request arrives at an inopportune time, such as when in a meeting or the like.

In addition, the present invention provides the ability of the calling party to respond to the data message with a response data message. This allows the calling party to effectively communicate with the called phone without establishing a call path between the two phones.

Further, the present invention provides for conversion of the response messages. This allows the called party to send s data message to the calling party even when the calling phone is not data capable. The data message is received by a server that converts the data message to a voice (speech) message and sends the voice message to the calling phone. Likewise, the present invention provides a server that includes an automates speech recognition function for translating speech into text, which allows a user of a phone that is not data-capable from corresponding with a data-capable phone without establishing a call path between the two phones.

While this invention has been described in terms of certain examples thereof, it is not intended that it be limited to the above description, but rather only to the extent set forth in the claims that follow.

We claim:

1. A method for sending a data response from a called phone to a calling phone, the method comprising the steps of:
   receiving a call request from the calling phone at the called phone, the call request being a request for the called phone to establish a voice communication on a call path by answering the call request;
   sending a data message from the called phone to the calling phone in response to the call request without establishing the voice communication on the call path between the calling phone and the called phone; and
   receiving the data message at the called phone from the calling phone.

2. A method for sending a data response from a called phone to a calling phone in accordance with claim 1, the method further comprising the step of converting the data message to a speech message.

3. A method for sending a data response from a called phone to a calling phone in accordance with claim 2, wherein the step of converting the data message to a speech message comprises the step of utilizing a text-to-speech converter.

4. A method for sending a data response from a called phone to a calling phone in accordance with claim 1, wherein the step of receiving a call request from the calling phone comprises the step of receiving a call request that includes an indicator that the calling phone is capable of receiving a data message.

5. A method for sending a data response from a called phone to a calling phone in accordance with claim 4, wherein the step of receiving a call request from the calling phone comprises the step of receiving a call request that includes an indicator that the calling phone is capable of receiving a multimedia message.

6. A method for sending a data response from a called phone to a calling phone in accordance with claim 1, the method further comprising the step of sending a response data message from the calling phone to the called phone in response to the data message without establishing the call path between the called phone and the calling phone.

7. A method for sending a data response from a called phone to a calling phone in accordance with claim 1, the method further comprising the steps of:
   sending a response message to the called phone, the response message being a voice message;
   receiving the response message at a server;
   converting the response message to a data message to produce a response data message; and
   sending the response data message to the called phone without establishing the call path between the called phone and the calling phone.

8. A method for sending a data response from a called phone to a calling phone in accordance with claim 7, wherein the step of converting the response message to a data message comprises converting the response message utilizing an automated speech recognition resource.

9. A method for sending a data response from a called phone to a calling phone in accordance with claim 1, further comprising the step of providing the called phone with an option of sending a data response without establishing the voice communication between the calling phone and the called phone prior to sending the data message from the called phone to the calling phone.

10. A method for sending a data response from a called phone to a calling phone in accordance with claim 1, the method further comprising the step of determining whether the calling phone is capable of receiving a data message.

11. A method for sending a data response from a called phone to a calling phone in accordance with claim 10, wherein the step of determining whether the calling phone is capable of receiving a data message comprises the step of determining whether the calling phone is capable of receiving a multimedia message.

12. A method for sending a data response from a called phone to a calling phone that is not capable of receiving a data message, the method comprising the steps of:
   receiving a call request from the calling phone at the called phone, the call request being a request for the called phone to establish a voice communication on a call path by answering the call request;
   sending a data message from the called phone to a server without establishing the voice communication on the call path between the calling phone and the called phone;

converting the data message to a speech message at the server; and sending the speech message from the server to the calling phone without establishing the call path between the called phone and the calling phone.

13. A method for sending a data response from a called phone to a calling phone that is not capable of receiving a data message in accordance with claim 12, wherein the step of convening the data message to a speech message comprises utilizing a text-to-speech converter.

14. A method for sending a data response from a called phone to a calling phone that is not capable of receiving a data message in accordance with claim 12, wherein the step of receiving a call request from the calling phone comprises the step of receiving a call request that includes an indicator that the calling phone is not capable of receiving a data message.

15. A method for sending a data response from a called phone to a calling phone that is not capable of receiving a data message in accordance with claim 12, the method further comprising the step of receiving a response data message at the called phone from the calling phone in response to the data message.

16. A method for sending a data response from a called phone to a calling phone that is not capable of receiving a data message in accordance with claim 15, wherein the step of receiving a response data message at the called phone comprises the steps of:

sending a voice response message in response to the data message from the calling phone to the server;

converting the voice response message to the data message; and sending the data message from the server to the called phone.

17. A method for sending a data response from a called phone to a calling phone that is not capable of receiving a data message in accordance with claim 16, wherein the step of converting the voice response message to the data message comprises converting the voice response message utilizing an automated speech recognition resource.

18. A communication system comprising:

a calling phone that sends a call request to establish a voice communication by answering the call request;

a called phone that receives the call request from the calling phone and responds with a data message to the call request without establishing the voice communication between the calling phone and the called phone; and a server that intercepts the data message, converts the data message to a speech message, and sends the speech message to the calling phone.

19. A communication system for sending a data response from a called phone to a calling phone in response to a call request from the calling phone, the communication system comprising:

a base station that transmits a call request received from a calling phone to a called phone, the call request being a request to establish a voice communication between the calling phone and the called phone on a call path by answering the call request, the base station also receiving a data message in response to the call request without establishing the voice communication between the calling phone and the called phone on the call path, the base station forwarding the data message; and a server that intercepts the data message, converts the data message to a speech message, and sends the speech message to the calling phone.

20. A communication system in accordance with claim 19, wherein the server converts the data message to a speech message utilizing a text-to-speech converter.

21. A communication system in accordance with claim 19, wherein the base station receives a response data message from the calling phone in response to the data message and forwards the response data message to the called phone.

* * * * *